US008463814B2

(12) United States Patent
Terranova et al.

(10) Patent No.: US 8,463,814 B2
(45) Date of Patent: Jun. 11, 2013

(54) COPY PROTECTED DIGITAL DATA (75) Inventors: Sabine Terranova, Stuttgart (DE);
Alexander Vollschwitz, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 1013 days.

(21) Appl. No.: 10/528,722

(22) PCT Filed: Jul. 19, 2004

(86) PCT No.: PCT/EP2004/008055
§ 371 (c)(1),
(2), (4) Date: Jul. 19, 2006

(87) PCT Pub. No.: WO2005/050639
PCT Pub. Date: Jun. 2, 2005

(65) Prior Publication Data
US 2006/0253713 A1  Nov. 9, 2006

(30) Foreign Application Priority Data
Nov. 19, 2003 (EP) .................................... 03026637

(51) Int. Cl.
*G06F 7/00* (2006.01)
*H04N 7/167* (2006.01)
(52) U.S. Cl.
USPC .......................................... 707/783; 380/201
(58) Field of Classification Search
USPC ............................ 707/783; 713/150; 380/201
See application file for complete search history.

(56) References Cited

U.S. PATENT DOCUMENTS

| 6,144,743 | A  | * | 11/2000 | Yamada et al. ................. 380/44 |
| 7,039,955 | B2 | * | 5/2006  | Kahn et al. ...................... 726/28 |
| 2002/0023219 | A1 | * | 2/2002 | Treffers et al. ................ 713/176 |
| 2002/0029340 | A1 | * | 3/2002 | Pensak et al. ................. 713/182 |
| 2002/0087883 | A1 |   | 7/2002 | Wohlgemuth et al. |
| 2002/0164047 | A1 |   | 11/2002 | Yuval |
| 2004/0019801 | A1 | * | 1/2004 | Lindholm et al. ............ 713/200 |

FOREIGN PATENT DOCUMENTS
EP   0 813 194     12/1997
WO   WO 02/15184   2/2002

* cited by examiner

*Primary Examiner* — Kimberly Wilson
(74) *Attorney, Agent, or Firm* — Oblon, Spivak, McClelland, Maier & Neustadt, L.L.P.

(57) ABSTRACT

The present invention relates to digital data comprising a passive part (2) comprising content (1) to be protected in encrypted form, an active part (3) comprising information (4) how to decrypt the content (1) comprised in the passive part (2) and a hidden part (6), wherein the active part (3) and the corresponding passive part (2) constitute an active content (8) and the hidden part (6) comprising information (7) about properties of the respective active content (8) and/or respective active part (3) and/or the respective passive part (2). The active part (2) of the active content (8) additionally comprises rules (5) to allow and/or forbid decryption of the content (1) comprised in the passive part (2) of the active content (8) based on the information (7) comprised in the hidden part (6). With that neither a central database has to be accessed nor a special hardware has to be provided.

25 Claims, 4 Drawing Sheets

COPY PROTECTED DIGITAL DATA

The present invention relates to a copy protected digital data comprising the features of the preamble of independent claim 1 and to a recording medium comprising a copy protected digital data according to one of the claims 1 to 21.

Furthermore, the present invention relates to a method of reproducing a copy protected digital data.

Said digital data frequently is provided in the form of data files which are operable by an operating system of a reproducing apparatus, e.g. a personal computer, a CD-player or a DVD-player. When digital data is stored into said reproducing apparatus, the operating system usually creates a data set allocated to the respective data file, the data set comprising information about the storing location, the size and the storing date of the data file.

Illegal copies of digital data (e.g. music or video data, software, or databases) result in an extraordinary monetary damage both for the owner of the respective intellectual property and for the resellers and support providers.

In this respect it has to be emphasised that illegal copies of digital data are not only created by the organised crime but also by ordinary users of e.g. personal computers, CD writers or DVD writers.

Making copies of digital data and providing them in a perfect quality becomes easier since copy possibilities increase and copying programmes become more comfortable. Furthermore, the prices for recording media are decreasing.

Therefore, the providers of digital data are searching for solutions to prevent manufacture and distribution of illegally copied digital data.

A first proposal to solve this problem is product activation which is frequently used with software products:

A software product using product activation automatically generates an individual product key based on a serial number of the product and a hardware identifier (e.g. the serial number of a processor used in a personal computer).

This product key has to be send via the Internet or by telephone to a service centre which generates an activation key based on the product key and information stored in a central database provided at the service centre.

To run the software product the activation key has to be input first.

If a software product using this prior art technology is copied to another personal computer, the activation key becomes invalid since the hardware identifier which was used as a basis to generate the individual product key necessarily has changed. In consequence, the activation key which was generated based on the individual product key does not longer apply. Thus, each time the software product is installed to a new personal computer or the hardware configuration is significantly changed, a separate activation procedure has to be performed to run the product. Since activation of a software product bearing a certain serial number is stored in the central data base at the service centre, it can be reliably avoided that a software product bearing a certain serial number is activated more often then allowed by the corresponding license. Therefore, the use of illegal copies of the software product can be avoided.

Another proposal to solve the above problem is disclosed in the U.S. patent application Ser. No. 09/848,468 (publication no. US 2002/0164047 A1).

The system and method described therein bases on embedding and detecting a one-bit watermark in a digital content file. The digital watermark is a sequence that is embedded into digital content but is imperceptible when the content is played. A certificate associated with said digital watermark has to be provided to allow copying and playback of the digital content. The certificate contains copyright information that indicates permissible used of the digital content file, e.g. the number of times the digital content file may be reproduced. Usually, the certificate is stored in a central data base accessible via the Internet, for example. The watermark is virtually non-removable from the content, meaning that if the watermark is removed, the perceptual quality of the digital content is significantly altered.

A further prior art solution to solve the above problem is disclosed in the U.S. application Ser. No. 09/847,813 (publication no. US 2002/0087883 A1).

The proposed process for preventing the privacy of application programs resident on a server and remotely accessed across a computer network by a client system in a computer environment comprises the steps of providing a network file system on said client, wherein said network file system handles and forwards all requests from local processes on the client that are directed at application program files located on said server. Said file system examines each of said requests and either grants or denies each of said requests depending on whether the request is justifiable from a security perspective by using information that includes the nature of the originating process, the history of previous accesses by the process, and/or the section of the target file being requested. Furthermore, a network redirector component of said network file system is provided, wherein said network redirector component makes visible to said network file system a path that represents the server where said application program files are stored.

According to a further prior art approach, a special hardware (e.g. "dongle") has to be attached to a personal computer to activate a software product.

It is a disadvantage with the above described prior art solutions that they are very uncomfortable for a user since either a central database has to be accessed or a special hardware has to be provided.

Therefore, it is the object of the present invention to provide copy protected digital data which combines a high level of copy protection and a high user frankness. It is a further object of the present invention to provide a method for reproducing said copy protected digital data.

The above object is solved in a copy protected digital data comprising the features of the preamble of independent claim 1 by the features of the characterising part of claim 1.

Furthermore, the above object is solved by a method comprising the features of independent claim 23.

According to the present invention a copy protected digital data comprises a passive part comprising content to be protected in encrypted form, an active part comprising information how to decrypt the content comprised in the passive part and a hidden part, wherein the active part and the corresponding passive part constitute an active content, the hidden part is allocated to the active content and/or the active part of the active content and/or the passive part of the active content, the hidden part comprising information about properties of the respective active content and/or respective active part and/or the respective passive part and the active part of the active content additionally comprises rules to allow and/or forbid decryption of the content comprised in the passive part of the active content based on the information comprised in the hidden part.

Thus, the inventive copy protected digital data does not prevent the copying of the digital data itself, but controls decryption of encrypted content comprised in said digital data. In consequence, reproduction of said copy protected digital data is limited.

A hidden part of the copy protected digital data which is allocated to the active content is provided by the file system of each conventional operating system to allow addressing of the active content. Therefore, said hidden part meets the standards of the respective operating system. According to the present invention, properties of the respective active content and/or the respective active and/or passive part of the copy protected digital data (e.g. storing location of the copy protected digital data, creation time of the copy protected digital data, time of last access/modification of copy protected digital data etc.) comprised in said hidden part are used for copy protection. Thus, no specialised hardware or central database has to been provided. No user input is necessary. In consequence, the inventive copy protected digital data is very user-friendly.

Furthermore, said hidden part usually is invisible for a user and thus hard to manipulate. Consequently, the inventive copy protected digital data provides a high level of copy protection.

Advantageously the active part is adapted to read out the information comprised in the respective hidden part, to compare said information with the rules and to perform or deny decryption of the content comprised in the passive part based on a comparison result.

Since control of the copy protection provided by the copy protected digital data is performed by the active part only, no specialised software or hardware or operating system has to be provided. Furthermore, both the read out operation and the comparison operation are simple and consume very few processor time.

Preferably, the active part of the active content is adapted to permanently deny decryption of the content comprised in the passive part of the active content if the information comprised in the hidden part does not comply with the rules of the active part.

Thus, once a manipulation of the copy protected digital data is detected, the illegal copy can be made unusable.

Since the copy protected digital data usually is adapted to be reproduced plural times it is preferred that the active part further comprises information how to encrypt the content comprised in the passive part.

By encrypting the content after reproduction by use of the active part, a manipulation of said encryption is hard to perform since no separate encryption means are used.

According to a preferred embodiment of the present invention, based on a request to reproduce the content comprised in the passive part, the active part is further adapted to perform decoding and/or reproduction of decrypted content after decryption of the content comprised in the passive part.

Thus, the reproduction of the copy protected digital data can be performed by itself. In consequence, no separate player (which might be manipulated to overcome the copy protection) is needed. Moreover, user friendliness is further enhanced.

Preferably, the active part is adapted to completely load and delete the passive part, to decrypt and reproduce the content comprised in the loaded passive part, to encrypt the decrypted content after reproduction and to store the encrypted content into a new passive part.

In this respect, it is beneficial if the active part is adapted to perform loading, deletion, decryption, encryption and storing of the content comprised in the passive part in real time during reproduction of the content comprised in the passive part.

Thus, at no time during a reproduction operation a complete data set of encrypted content is provided. Therefore, even during reproduction of the copy protected digital data a high level of copy protection is maintained.

Advantageously, the active part is adapted to store the new passive part together with an adapted active part into a new active content.

By storing the new passive part into a new active content each time reproduction is performed, it is guaranteed in a very easy way that a correspondingly amended hidden part automatically is generated by an operating system which is used to perform said reproduction under control of the active part.

Favourably, the active part is adapted to automatically amend itself to build an amended active part each time decryption and/or encryption of the passive part is performed.

Thus, as well the active content as well the active part as well the passive part as well the hidden part of the copy protected digital data automatically can be amended each time reproduction of the copy protected digital data is performed. This makes it very hard to overcome the inventive copy protection.

It is profitable if the active part is a tamper resistant software to avoid manipulation of the active part.

Preferentially, the rules comprised in the active part comprise information how often the content comprised in the passive part is allowed to be decrypted and how often the content comprised in the passive part has already been decrypted.

Alternatively or additionally, the rules comprised in the active part may comprise information how long the content comprised in the passive part is allowed to be decrypted.

It is further advantageous, if the rules comprised in the active part comprise information how often the content comprised in the passive part is allowed to be lend and how often the content comprised in the passive part has already been lend.

As the active part and the passive part constitute an active content it is preferred that said active content constitutes a unitary data file operable by an operating system.

Furthermore, it is preferred that based on a request to decrypt and/or playback the content comprised in the passive part, the active part is adapted to separate the passive part from the active content for decryption of the content comprised in the passive part.

Thus, the active part and the passive part can be operated separately by the operating system under control of the active part.

Favourably, the hidden part automatically is allocated to the active content and/or the active part of the active content and/or the passive part of the active content by an operating system.

Thus, e.g. the windows file system (NTFS) can be used to automatically generate the hidden part which is allocated to the active content and thus to both the active part and the passive part.

It is preferred that the hidden part is stored in a system file (e.g. master table file) of an operating system since such a system file is invisible for a user.

Although the hidden part might be stored in decrypted form, for security reasons it is preferred to store the hidden part in encrypted form which might be envisaged by the respective operating system.

Advantageously, the hidden part further comprises information about the location of the active content and/or active part and/or passive part.

According to a preferred embodiment of the present invention the information comprised in the hidden part automatically is changed by an operating system to build an amended hidden part each time the active content and/or the active part of the active content and/or the passive part of the active content and/or the content comprised in the passive part of the active content is read out and/or amended and/or stored.

This is the standard with most operating systems.

Favourably, the encrypted content comprised in the passive part is digitised audio data and/or digitised video data and/or digitised picture date and/or a database and/or a software and/or digitised text.

The copy protected digital data according to one of the claims 1 to 21 preferably may be comprised in a recording medium or in a consumer electronic device or in a personal computer capable of downloading digital data.

Furthermore, the above object is solved by a method of reproducing a copy protected digital data comprising
- a passive part comprising content to be protected in encrypted form;
- an active part comprising information how to decrypt the content comprised in the passive part; and
- a hidden part;

wherein
the active part and the corresponding passive part constitute an active content,
the hidden part is allocated to the active content and/or the active part of the active content and/or the passive part of the active content, the hidden part comprising information about properties of the respective active content and/or respective active part and/or the respective passive part, and
the active part of the active content further comprises rules to allow and/or forbid decryption of the content comprised in the passive part of the active content based on the information comprised in the hidden part;

the method comprising the following steps:
- reading out the information comprised in the hidden part of the copy protected digital data;
- comparing said information with the rules comprised in the corresponding active part of the active content;
- denying decryption of the content comprised in the passive part of the active content if the information read out from the hidden part does not comply with the rules and terminating the method;
- loading the encrypted content comprised in the passive part of the active content if the information read out from the hidden part complies with the rules;
- performing decryption of the encrypted content; and
- reproducing decrypted content.

According to a preferred embodiment of the inventive method, the method further comprises the steps of deleting the passive part, encrypting the decrypted content after reproduction and storing the encrypted content into a new passive part.

In this respect it is preferred that the step of reproducing the decrypted content, the step of deleting the passive part and the step of encrypting the decrypted content after reproduction are performed in real time during reproduction of the decrypted content.

Favourably, the method further comprises the step of automatically amending the hidden part by control of an operating system to built an amended hidden part each time the active content and/or the active part of the active content and/or the passive part of the active content and/or the content comprised in the passive part of the active content is read and/or amended and/or stored.

Furthermore, it is beneficial if the method further comprises the steps of automatically amending the active part of the active content by control of the active part of the active content to build an amended active part each time decryption of the content comprised in the passive part is performed.

Moreover, the above object is solved by a software product comprising a series of state elements which are adapted to be processed by a data processing.

Figure 1:
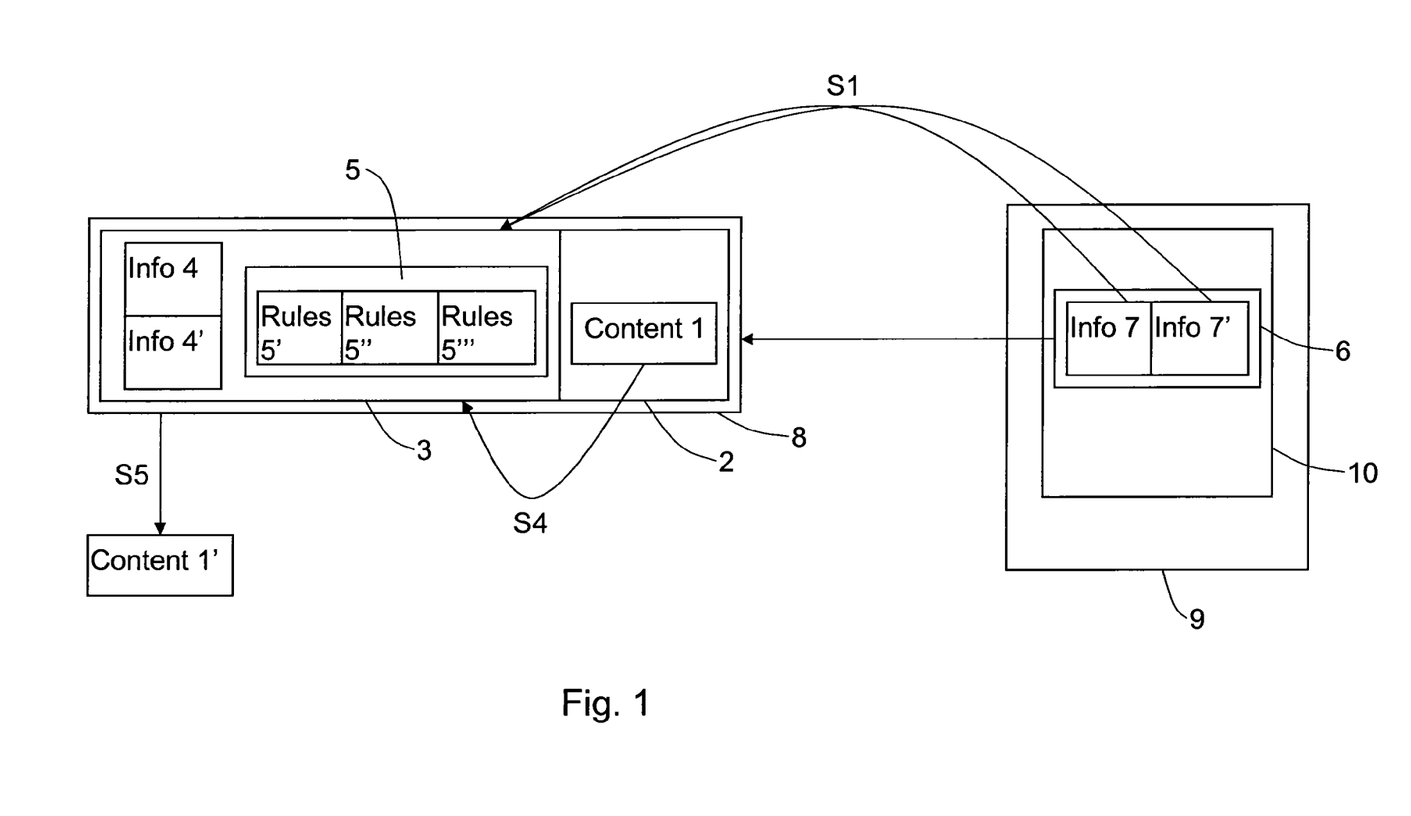
FIG. 1 shows a block diagram of a copy protected digital data according to a preferred embodiment of the present invention.

In the following detailed description, the present invention is explained by reference to the accompanying drawings, in which like reference characters refer to like parts throughout the views, wherein:

FIG. 1 shows a block diagram of a preferred embodiment of copy protected digital data according to the present invention.

Said copy protected digital data comprises a passive part 2 and an active part 3. Both the active part 3 and the passive part 2 together constitute an active content 8 which is a data file operable by an operating system 9 of a data reproducing apparatus.

In the present embodiment, the data reproducing apparatus is a personal computer (not shown) and the operating system 9 is a "NT File System" (also called "New Technology File System") NTFS which is running on the personal computer. The NTFS stores file relevant information (file properties) either as resident attributes in a "Master File Table" MFT or as non-resident attributes separately from the MFT in runs or extends. It is well understood that alternatively any operating system other than the NTFS might be used.

Alternately, the data reproducing apparatus might be for example a CD or DVD recorder or a digital video recorder or a MP3-player. In this case, the operating system would be the software of the respective controller or an embedded operating system.

An encrypted digital content 1 is comprised in the passive part 2 of the active content 8. In the present embodiment, said content is a MP3 file comprising digitised audio data (music).

Alternatively, said encrypted content 1 might be digitised video data, digitised picture data, digitised text data (e-book), a data base or a software. It is obvious that said content 1 even might be a mix of different kinds of digital or digitised data which might be provided in any known or future format e.g. MPEG, JPEG/BMP, etc.

Since the content 1 is comprised in the passive part 2 in encrypted form, it is not possible to read out or to reproduce the information comprised in the content 1 from the passive part 2 without decryption. Thus, the passive part 2 comprises the "raw" information and does not comprise information how to read or reproduce said information.

The active part 3 comprises information 4 how to decrypt the content 1 comprised in the passive part and information 4' how to encrypt decrypted content 1' received by decrypting the content 1 comprised in the passive part 2.

Furthermore, the active part 2 comprises rules 5 to allow and/or forbid decryption of the content 1 comprised in the passive part 2 based on information 7 comprised in a hidden part 6 provided under control of a operating system 9.

In the present embodiment, said rules 5 comprise internal information 5' how often the content 1 comprised in the passive part 2 is allowed to be decrypted and how often the content 1 has already been decrypted by the active part 3, information 5" for which time period the content 1 is allowed to be decrypted and for which time period the content 1 has already been decrypted by the active part 3 and information 5''' how often the content 1 is allowed to be lend and how often the content 1 has already been lend. The information 5''' how often the content 1 comprised in the passive part 2 has already been lend can be received e.g. by logging the different hardware characteristics of the reproducing apparatus the active content 8 has already been stored to.

It is evident that further rules and internal information (e.g. size, frequency of accesses of the passive part 2 etc.) to allow and/or forbid decryption of the content comprised in the passive part based on information comprised in a hidden part might be provided in the active part.

Thus, the active part 3 compares the information 7 comprised in the hidden part 6 with the internal information 5, 5', 5" etc. and decides based on the rules 5 by using the comparison result whether it is possible to decrypt the passive part 2 of the active content 8 or not.

Moreover, the active part 3 is adapted to perform decoding and reproduction of decrypted content 1' which is generated by decryption of the content 1 comprised in the passive part 2. Thus, the active part 3 additionally knows how to play back the passive part 2.

In the present embodiment, the active part 3 consequently comprises a player for MP3 files. Therefore, in addition to the active part 3 no additional software is required (except the operating system) to reproduce the information comprised in the passive part 2. However it is possible to have the player itself or part of it external to the active content.

To avoid a manipulation of the active part 3, the active part is provided as a tamper resistant software (see e.g. D. AUC-SMITH "Tamper Resistant Software: an Implementation" and the essay "The Encoder Solution To Implementing Tamper Resistant Software" by J. R. NICKERSON, S. T. CHOW, H. J. JOHNSON, and Y. GU).

In the present embodiment, the hidden part 6 is allocated to the active content 8 and thus to both the active part 3 and the passive part 2.

Alternatively, the hidden part might be allocated to the active part and/or the passive part, only.

The information 7 comprised in the hidden part 6 relates to properties of the active content 8 and thus to properties of both the active part 3 and the respective passive part 2. In the present example, said properties comprise creation time of the active content 8, time of last modification or time of last access of the active content 8, storing location of the active content 8 and size of the active content 8.

In the present embodiment, the hidden part 6 is stored in the Master Table File MTF 10 of the NTFS operating system 9. Thus, the hidden part 6 is not directly attached to the active content 8 in a literal sense but stored with the system files of the operating system 9 onto a hard disc.

It is obvious that said hidden part 6 alternatively might be stored in another suitable system file of the respective operating system or as a file extension together with the active content and/or active part and/or passive part. Further alternatively, the hidden part might be stored in runs of the active content comprising the active part and the passive part.

Moreover, said system files of the operating system alternatively might be stored on an arbitrary portable volume, e.g. a changeable hard disc or a floppy disc. In case of a changeable hard disc or floppy disc said system file is e.g. a leading track comprising the file structure of the respective volume. Thus, said file structure is not necessarily a physical part of the operating system, but has to comply with the requirements of the respective operating system, only. Furthermore, the hidden part stored in the file system has to be allocated to the respective active content and thus to the respective active part and/or passive part of the copy protected digital content. Moreover, the active part has to comprise information where the respective hidden part is located and how it is read out.

The hidden part is not directly visible to a user because to its relation to the operating system 9 and is written according to the standards of the respective operating system 9 (in the present embodiment the NTFS standard).

Although the hidden part 6 might not be store in encrypted form, according to an alternative embodiment, the operating system automatically encrypts the hidden part for security reasons (either separately or together with other sensible system files).

Figure 2:
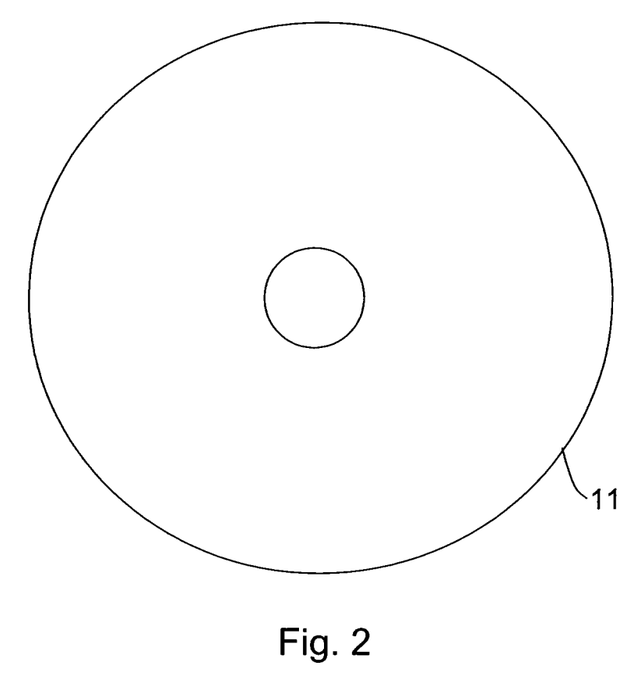
FIG. 2 schematically shows a recording medium comprising the copy protected digital data of FIG. 1.

The above described copy protected digital data may be stored onto a recording medium 11 as it is shown in FIG. 2. In the present example, a DVD is shown. Alternatively, the recording medium may be a hard disk, a CD or a floppy disk, for example.

The active and passive part of the copy protected digital data are stored together as an uniform active content in the data storing area of the portable volume. The hidden part is stored either in the system file in the system file area of the portable volume, wherein the system file meets the standards of the operating system the portable volume is intended for, or as a file extension or runs together with the active content and/or active part and/or passive part in the data storing area of the portable volume. The active content and the hidden part might even be stored to different volumes provided there is a clear allocation between the hidden part and the respective active content which is recognised both by the operating system and the respective active part of the active content.

In case of a read only portable volume which allows direct playback of the copy protected digital data, the information comprised in the hidden part and the corresponding rules comprised in the active part are constant and permanently written onto the portable volume by a manufacturer of the copy protected digital data. Since the information comprised in the rules of the active part of the active content can not be changed, said information and rules have to be chosen in a suitable way (e.g. decryption of passive part is allowed till a certain date).

In case installation of the copy protected digital data from a first volume (e.g. a floppy disc, DVD or CD or the Internet) onto a second volume e.g. a hard disc is allowed by the rules comprised in the active part of the copy protected digital data, a new hidden part which is allocated to the active content and/or active part and/or passive part stored onto the second volume automatically is generated by the respective operating system. In line with the rules comprised in the active part stored onto the first volume and the corresponding information comprised in the hidden part stored onto the first volume, the rules and internal information comprised in the active part stored onto the second volume automatically are amended to correspond to the new hidden part under control of the active part stored onto the first volume.

In this respect, if the first volume is a recordable volume, during or after installation of the copy protected digital data the active content and/or active part and/or passive part automatically might be amended under control of the active part stored onto the first volume which necessarily results in a corresponding amendment of the respective hidden part stored onto the first volume under control of the respective operating system. Alternatively, the active part might be adapted to actively amend the hidden part.

Thus, it is guaranteed that each installation procedure is recognised by the inventive copy protected digital data and thus can be allowed or denied according to predetermined rules stored in the active part.

Figure 3:
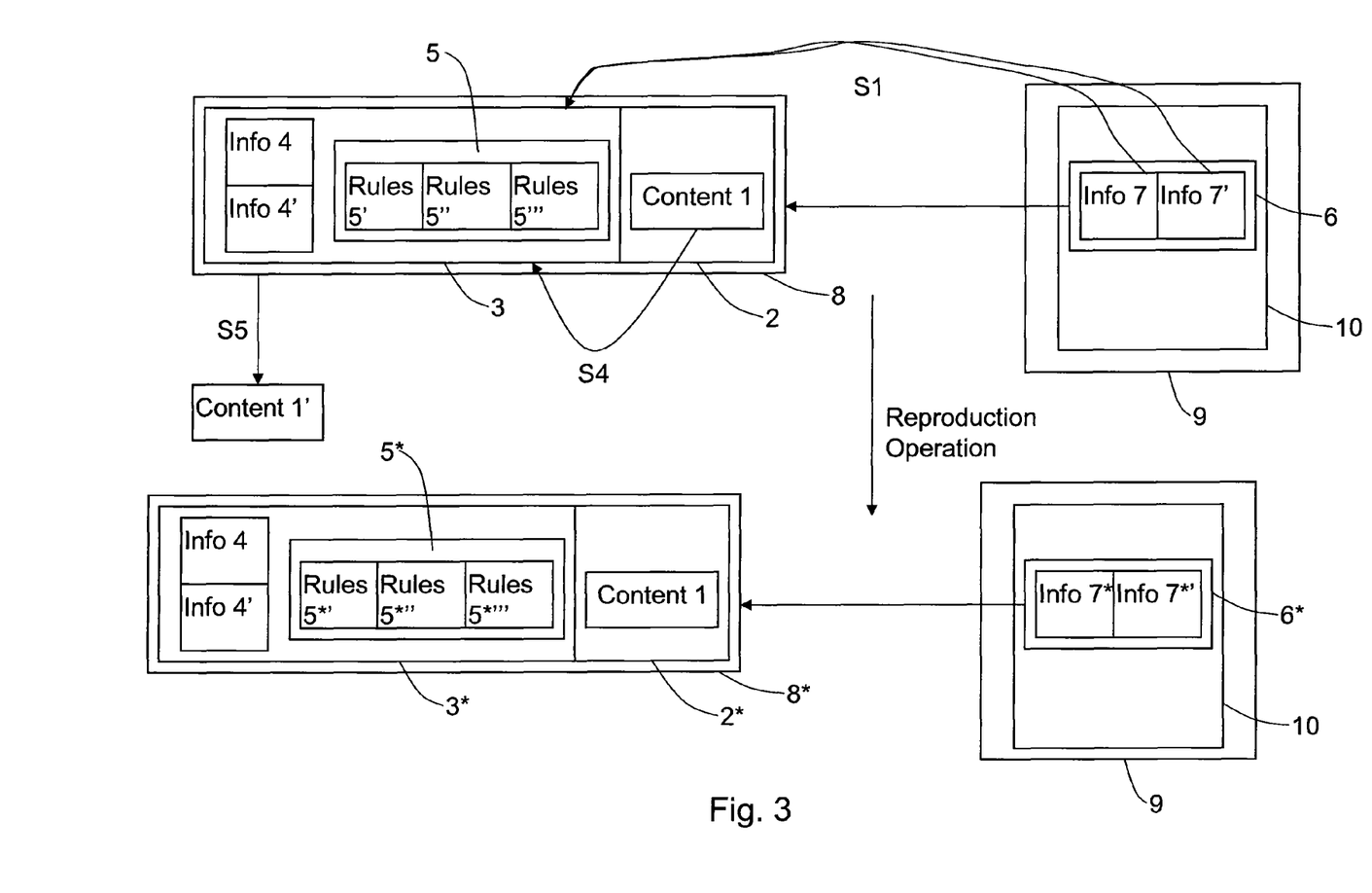
FIG. 3 shows a block diagram to explain reproduction of the copy protected digital data according to the preferred embodiment of the present invention.
Figure 4:
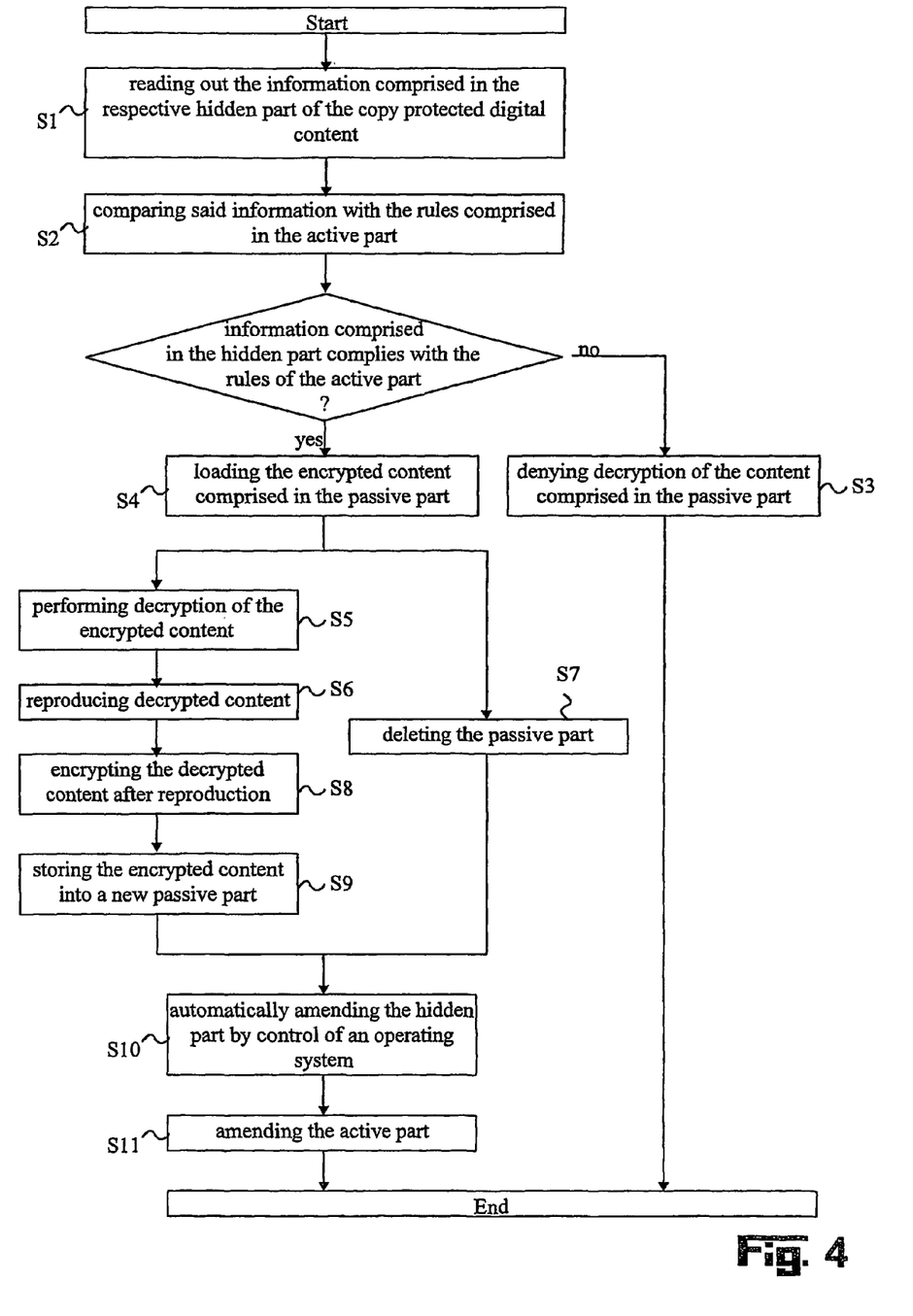
FIG. 4 shows a flow diagram of the inventive method for reproducing a copy protected digital data.

In the following, the function of the above described copy protected digital data and a preferred method for reproducing the copy protected digital data are explained by reference to FIGS. 3 and 4.

In this preferred embodiment, the active part 3 is adapted to read out the information 7, 7' comprised in the hidden part 6 of the copy protected digital data. Said hidden part 6 is stored in the Master Table File 10 of the operating system 9. This reading operation is performed by the operating system 9 under control of the active part 3 in a first step S1.

Furthermore, the active part 3 is adapted to compare said information 7, 7' with the rules 5', 5" and 5'" comprised in the active part 3 in step S2.

If the information 7, 7' does not comply with the rules 5', 5" and 5'" (e.g. the creation time or time of last modification of the active content 8 which is stored in the hidden file does not correspond to the creation time or time of last modification of the active content 8 stored as an internal information in the active part 3, respectively), it is supposed that an illegal copy has been detected. In consequence, decryption of the content 1 comprised in the passive part 2 is denied by the active part 3 in step S3 and the method for reproducing copy protected digital data is terminated.

Alternatively, the illegal copy might be identified by a difference in storage location of the active content 8 or a difference in size of the active content 8, for example. Further alternatively, the number of different reproducing apparatus the copy protected digital content can be installed to (corresponding to a maximum number of possible lends) might be exceeded.

If appropriate, the active part 3 additionally might be adapted to amended the passive part 2 in a way that a decryption of the content 1 comprised in the passive part 2 becomes permanently impossible to permanently make the illegal copy unusable and thus to permanently deny decryption of the content 1 comprised in the passive part 2.

In case the information 7, 7' complies with the internal information stored in the active part 3 and thus meets rules 5', 5" and 5'", the active part 3 is further adapted to perform decryption of the content 1 comprised in the passive part 2.

To perform said decryption it can be appropriate that the active part 3 is adapted to firstly completely load the active content 8 and to separate the passive part 2 and the active part 3 from the active content 8 based on a request to reproduce the content 1 comprised in the passive part 2.

In the following step S4 the active part 3 completely loads the encrypted content 1 comprised in the passive part 2.

Afterwards (step S5) the active part 3 decrypts the content 1 comprised in the passive parts 2 to build a decrypted content 1' by using the information 4 how to decrypt the content 1 which is stored in the active part 3.

Following decryption, the decrypted content 1' is reproduced by the active part 3 in step S6.

During the reproduction, a return (feedback) channel between a user and the active part 3 is provided which notifies the active part 3 about what a user did or wants to do. This return channel is necessary if e.g. a user wants to stop reproduction of the content 1 comprised in the passive part 2. In this case, the active part 3 has to decide based on his rules 5 whether the user is allowed to resume reproduction or to reproduce the complete content 1 once again. In this case, the original passive part 2 would have to be reconstructed under control of the active part 3 or a new passive part 2* would have to be generated under control of the active part 3. Preferably, the original name of the passive part is maintained.

Since the reproduction of the inventive copy protected digital data is performed by itself, no separate player (which might be manipulated to overcome the copy protection) is needed and thus user friendliness is further enhanced.

Immediately after reproduction of a fraction of the decrypted content 1', the active part 3 encrypts the decrypted content 1' in step S8 by using information 4' stored in the active part 3.

By encrypting the content immediately after reproduction under control of the active part 3, a manipulation of said encryption is hard to perform since no separate encryption means are needed.

Said encrypted content 1 is stored in step S9 into a new passive part 2*.

When performing steps S5, S6, S8 and S9, in the meantime the active part 3 deletes the passive part 2 in the parallel step S7.

Thus, when reproduction is performed, the loading, decryption, reproduction, encryption and storing of the content 1 comprised in the passive part 2 is performed in real time. Bits comprised in the passive part 2 which have been decrypted immediately are reproduced and immediately are encrypted after reproduction and stored into a new data file as a new passive part 2*. Fractions of the passive part 2 which have already been reproduced are deleted immediately after reproduction. In this respect it is preferred that the original name of the passive part 2 is maintained.

Since loading, deletion, decryption, encryption, and storing of the content 1 comprised in the passive part 2 are performed in real time by the active part 3, at no time of the reproducing operation a completed data set of encrypted content 1' is provided. Therefore, even during reproduction of the copy protected digital data a high level of copy protection is maintained.

By storing the reproduced and encrypted content 1 into a new passive part 2* (which might be comprised in a new or modified active content) each time reproduction is performed, the operating system 9 automatically allocates a new/an amended hidden part 6* to the new passive part 2* (or the active content comprising the new passive part) in the following step S10. Thus, the property information of the passive part 2, 2* comprised in the hidden part 6* automatically is changed each time the content 1 comprised in the passive part 2, 2* is reproduced. It has to be stressed that the hidden part 6 alternatively might be amended under control of the active part 3 each time the passive part is read out or changed due to a reproducing or copying operation.

After completion of the reproducing operation, the active part 3 is adapted to automatically amend itself and to update the rules 5', 5" and 5'" to build an amended active part 3* comprising amended rules 5*', 5*" and 5*'" (in step S11).

To additionally enhance security of copy protection, even the information 4 how to decrypt the content 1 comprised in the passive part 2* and the information 4' how to encrypt decrypted content 1 comprised in the passive part 2* may be modified under control of the active part 3, 3* each time reproduction is performed.

In consequence, after reproduction the active content 8* is different from the active content 8 before reproduction. To provide maximum security, as well the active part 3 as well the passive part 2 as well the hidden part 6 automatically are amended after reproduction each time reproduction of the copy protected digital data is performed. This makes it very hard to overcome the inventive copy protection.

It is evident that an amendment of the active part and/or the passive part and/or the hidden part requires that the respective part is stored onto recordable volume.

According to a second embodiment which is not shown in the figures, the active part and the passive part do not constitute an active content and thus might be separate data files operable separately by the respective operating system. Thus, the active part and the passive part do not necessarily have to be stored in physical vicinity to one another. In this case, the active part comprises information where the passive part is located or receives said information from a file system of the operating system.

It is well understood that alternatively the hidden part might be amended by the operating system with or without control of the active part each time the active part and/or the passive part and/or the active content is read and/or amended and/or stored. Furthermore, it is obvious that the file system of the respective operating system where the hidden part is stored to might be the file system of a CD, DVD or floppy disc, for example.

In summary, the present invention bases on the principle not to prevent copying of digital data itself but to control decryption of content comprised in said digital data and in consequence to allow or forbid the reproduction of a copy protected data file by using the properties of the file system of the respective operating system.

Normally, digital data cannot track how often it was copied of if it was moved from one location to another location.

This is recognised as file properties by the file system of a respective operating system:

A hidden part allocated to the copy protected digital data is provided by each conventional file system to allow addressing of the data. File system reader like the Windows Explorer are adapted to display some of said properties but do not allow modification of said information. The hidden part (which is invisible for a user) stores the properties of the copy protected digital data and provides them to the active part. In this respect, the hidden part preferably notices any slight modification of the active content and/or the active part and/or the passive part.

Furthermore, said hidden part meets the standards of the respective operating system. Thus, no specialised hardware or central database has to been provided. No user input is necessary. In consequence, the inventive copy protected digital data is very user-friendly. Furthermore, said hidden part usually is invisible for a user and thus hard to manipulate. Therefore the inventive copy protected digital data provides a high level of copy protection.

The active part evaluates the properties provided by the hidden part and allows or denies reproduction of the passive part. Thus, the active part reacts on modifications noticed by the hidden part. Since control of the copy protection provided by the copy protected digital data is performed by the active part, only, no specialised software or hardware or operating system has to be provided. Furthermore, both the read out operation and the comparison operation are simple and consume very few processor time.

Moreover, the above object is solved by a software product comprising a series of state elements which are adapted to be processed by a data processing means such, that the above described method may be executed thereon.

The invention claimed is:

1. A non-transitory data recording and processing medium in at least one of a consumer electronic device and a personal computer, comprising:
copy protected digital data comprising:
a passive part comprising content to be protected in encrypted form;
an active part comprising information about how to decrypt the content comprised in the passive part; and
a hidden part;
wherein the active part and the corresponding passive part constitute an active content and the hidden part is allocated to at least one of the active content, the active part of the active content and the passive part of the active content,
wherein the active part is configured to automatically amend itself to build an amended active part each time at least one of decryption and encryption of the passive part is performed,
wherein the hidden part comprises information at least about properties of said active content, said active part and said passive part;
wherein the active part of the active content further comprises rules that either allow or forbid decryption of the content comprised in the passive part of the active content based on the information comprised in the hidden part,
wherein said data is residing on said data recording and processing medium,
wherein said recording and processing medium pertains to at least one of the consumer electronic device and the personal computer, and
wherein the active part of the active content is configured to permanently deny decryption of the content comprised in the passive part of the active content if the information comprised in the hidden part does not comply with the rules of the active part.

2. The data recording and processing medium of claim 1, wherein the active part is configured to:
read out the information comprised in said hidden part;
compare said information with the rules; and
perform or deny decryption of the content comprised in the passive part based on a comparison result.

3. The data recording and processing medium of claim 1, wherein
the active part further comprises information about how to encrypt decrypted content.

4. The data recording and processing medium of claim 1, wherein
the active part is further configured to perform at least one of decoding and reproduction of decrypted content after decryption of the content comprised in the passive part.

5. The data recording and processing medium of claim 1, wherein
the active part is configured to:
completely load and delete the passive part,
to decrypt and reproduce the content comprised in the loaded passive part,
to encrypt the decrypted content after reproduction, and
to store the encrypted content into a new passive part.

6. The data recording and processing medium of claim 5, wherein
the active part is configured to
perform loading, deletion, decryption, encryption and storing of the content comprised in the passive part in real time during reproduction of the content comprised in the passive part.

7. The data recording and processing medium of claim 5, wherein
the active part is configured to store the new passive part together with an adapted active part into a new active content.

8. The data recording and processing medium of claim 1, wherein
the active part is a tamper resistant software.

9. The data recording and processing medium of claim 1, wherein
the rules comprised in the active part comprise:
information about how often the content comprised in the passive part is allowed to be decrypted, and about how often the content comprised in the passive part has already been decrypted.

10. The data recording and processing medium of claim 1, wherein
the rules comprised in the active part comprise information about how long the content comprised in the passive part is allowed to be decrypted.

11. The data recording and processing medium of claim 1, wherein
the rules comprised in the active part comprise information about how often the content comprised in the passive part is allowed to be lend and how often the content comprised in the passive part has already been lend.

12. The data recording and processing medium of claim 1, wherein
the active content comprises a data file operable by an operating system.

13. The data recording and processing medium of claim 1, wherein
the active part is configured to separate the passive part from the active content for decryption of the content comprised in the passive part.

14. The data recording and processing medium of claim 1, wherein
the hidden part automatically is allocated to at least one of the active content, the active part of the active content and the passive part of the active content by an operating system.

15. The data recording and processing medium of claim 1, wherein
the hidden part is stored in a system file of an operating system.

16. The data recording and processing medium of claim 1, wherein
the hidden part is stored in encrypted form.

17. The data recording and processing medium of claim 1, wherein
the hidden part further comprises information about at least one of the location of the active content, the active part of the active content and passive part of the active content.

18. The data recording and processing medium of claim 1, wherein
the information comprised in the hidden part is automatically changed by an operating system to build an amended hidden part each time at least one of the active content, the active part of the active content, the passive part of the active content, the content comprised in the passive part of the active content is at least one of read out, amended, and stored.

19. The data recording and processing medium of claim 1, wherein
the encrypted content comprised in the passive part is at least one of digitized audio data, digitized video data, digitized picture data, a database, a software, and digitized text.

20. Method of reproducing a copy protected digital data in at least one of a consumer electronic device and a personal computer, the copy of protected digital data comprising:
a passive part comprising content to be protected in encrypted form;
an active part comprising information about how to decrypt the content comprised in the passive part; and
a hidden part in the at least one of the consumer electronic device and the personal computer;
wherein the active part and the corresponding passive part constitute an active content,
wherein the hidden part is allocated either to the active content the active part of the active content and the passive part of the active content,
wherein the hidden part comprises information about at least one of the properties of said active content and/or respective active part and/or the respective passive part,
wherein the active part of the active content further comprises rules to allow and forbid decryption of the content comprised in the passive part of the active content based on the information comprised in the hidden part; and
wherein the active part of the active content is configured to permanently deny decryption of the content comprised in the passive part of the active content if the information comprised in the hidden part does not comply with the rules of the active part;
the method comprising at least the following steps:
reading the information comprised in the hidden part of the copy protected digital data;
comparing said information with the rules comprised in the corresponding active part of the active content;
denying decryption of the content comprised in the passive part of the active content if the information read from the hidden part does not comply with the rules and terminating the method;
loading the encrypted content comprised in the passive part of the active content if the information read from the hidden part complies with the rules;
performing decryption of the encrypted content;
reproducing decrypted content; and
automatically amending the active part of the active content by control of the active part of the active content to build an amended active part each time decryption of the content comprised in the passive part is performed.

21. The method according to claim 20, wherein the method further comprises the steps of
deleting the passive part;
encrypting the decrypted content after reproduction; and
storing the encrypted content into a new passive part.

22. The method according to claim 21, wherein the step of reproducing the decrypted content, the step of deleting the passive part and the step of encrypting the decrypted content after reproduction are performed in real time during reproduction of the decrypted content.

23. The method according to claim 20, wherein the method further comprises the step of:
automatically amending the hidden part by control of an operating system to built an amended hidden part each time at least one of the active content, the active part of the active content the passive part of the active content the content comprised in the passive part of the active content is read, amended and stored.

24. A non-transitory computer readable storage device in at least one of a consumer electronic device and a personal computer having computer readable instructions thereon that when executed by a processor implement a series of state elements configured to implement:
a passive part comprising content to be protected in encrypted form;

an active part comprising information about how to decrypt the content comprised in the passive part; and a hidden part in the at least one of the consumer electronic device and the personal computer;

wherein the active part and the corresponding passive part constitute an active content, wherein the hidden part is allocated either to the active content the active part of the active content and the passive part of the active content, wherein the hidden part comprises information about at least one of the properties of said active content and/or respective active part and/or the respective passive part, wherein the active part of the active content further comprises rules to allow and forbid decryption of the content comprised in the passive part of the active content based on the information comprised in the hidden part; and wherein the active part of the active content is configured to permanently deny decryption of the content comprised in the passive part of the active content if the information comprised in the hidden part does not comply with the rules of the active part;

and perform method steps including reading the information comprised in the hidden part of the copy protected digital data;

comparing said information with the rules comprised in the corresponding active part of the active content;

denying decryption of the content comprised in the passive part of the active content if the information read from the hidden part does not comply with the rules and terminating the method;

loading the encrypted content comprised in the passive part of the active content if the information read from the hidden part complies with the rules;

performing decryption of the encrypted content;

reproducing decrypted content; and automatically amending the active part of the active content by control of the active part of the active content to build an amended active part each time decryption of the content comprised in the passive part is performed.

25. A non-transitory computer readable storage device according to claim 24, wherein said hidden part being invisible to a user and implemented as a component of an operating system executed by the at least one of the consumer electronic device and personal computer.

* * * * *